(12) United States Patent
Murrow et al.

(10) Patent No.: US 9,777,642 B2
(45) Date of Patent: Oct. 3, 2017

(54) GAS TURBINE ENGINE AND METHOD OF ASSEMBLING THE SAME

(71) Applicant: General Electric Company, Schenectady, NY (US)

(72) Inventors: Kurt David Murrow, Liberty Township, OH (US); Andrew Breeze-Stringfellow, Montgomery, OH (US); Randy M. Vondrell, Sharonville, OH (US); Tsuguji Nakano, West Chester, OH (US); Jeffrey Anthony Hamel, Maineville, OH (US); Darek Tomasz Zatorski, Fort Wright, KY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 14/919,825

(22) Filed: Oct. 22, 2015

(65) Prior Publication Data
US 2016/0146115 A1     May 26, 2016

Related U.S. Application Data

(60) Provisional application No. 62/082,892, filed on Nov. 21, 2014.

(51) Int. Cl.
*F02C 1/00*     (2006.01)
*F02C 9/20*     (2006.01)
(Continued)

(52) U.S. Cl.
CPC .................. *F02C 9/20* (2013.01); *F01D 7/00* (2013.01); *F01D 15/12* (2013.01); *F01D 17/085* (2013.01);
(Continued)

(58) Field of Classification Search
CPC ... F02K 1/66; F02K 3/00; F02K 3/025; F02K 3/04; F02K 3/06; F02K 3/072; F02K 3/075; F02C 7/36
See application file for complete search history.

(56) References Cited

U.S. PATENT DOCUMENTS 3,946,554 A * 3/1976 Neumann ................. F02C 9/20
                                              415/1
3,979,903 A    9/1976 Hull et al.
(Continued)

FOREIGN PATENT DOCUMENTS

CN         1654804 A      8/2005
CN       102834316 A     12/2012
(Continued)

OTHER PUBLICATIONS

A European Search Report and Opinion issued in connection with corresponding EP Application No. 15194921.1 dated Apr. 18, 2016.
(Continued)

*Primary Examiner* — Gerald L Sung
(74) *Attorney, Agent, or Firm* — General Electric Company; William Scott Andes

(57) ABSTRACT

A method and system for a turbofan gas turbine engine system is provided. The gas turbine engine system includes a variable pitch fan (VPF) assembly coupled to a first rotatable shaft and a low pressure compressor LPC coupled to a second rotatable shaft. The LPC including a plurality of variable pitch stator vanes interdigitated with rows of blades of a rotor of the LPC. The gas turbine engine system also includes a speed reduction device coupled to said first rotatable shaft and said second rotatable shaft. The gas turbine engine system further includes a modulating pressure relief valve positioned between an outlet of said LPC and a bypass duct and a controller configured to schedule a position of said plurality of variable pitch stator vanes and
(Continued)

said modulating pressure relief valve in response to an operational state of said turbofan gas turbine engine system and a temperature associated with said LPC.

19 Claims, 3 Drawing Sheets

(51) Int. Cl.
| | |
|---|---|
| *F01D 7/00* | (2006.01) |
| *F01D 15/12* | (2006.01) |
| *F01D 17/08* | (2006.01) |
| *F01D 17/10* | (2006.01) |
| *F01D 17/16* | (2006.01) |
| *F02K 1/66* | (2006.01) |
| *F02K 3/04* | (2006.01) |
| *F02K 3/075* | (2006.01) |
| *F02C 3/13* | (2006.01) |
| *F02C 7/36* | (2006.01) |
| *F02C 9/18* | (2006.01) |
| *F02C 3/04* | (2006.01) |
| *F02C 7/042* | (2006.01) |

(52) U.S. Cl.
CPC ......... *F01D 17/105* (2013.01); *F01D 17/162* (2013.01); *F02C 3/04* (2013.01); *F02C 3/13* (2013.01); *F02C 7/042* (2013.01); *F02C 7/36* (2013.01); *F02C 9/18* (2013.01); *F02K 1/66* (2013.01); *F02K 3/04* (2013.01); *F02K 3/075* (2013.01); *F05D 2220/36* (2013.01); *F05D 2270/101* (2013.01); *F05D 2270/303* (2013.01); *F05D 2300/30* (2013.01); *Y02T 50/672* (2013.01)

(56) References Cited

U.S. PATENT DOCUMENTS

| | | | |
|---|---|---|---|
| 4,055,946 | A | 11/1977 | Sens |
| 4,594,849 | A | 6/1986 | Kenison et al. |
| 5,042,245 | A | 8/1991 | Zickwolf |
| 5,375,412 | A | 12/1994 | Khalid et al. |
| 8,256,707 | B2 | 9/2012 | Suciu et al. |
| 8,459,038 | B1 | 6/2013 | Lickfold et al. |
| 8,561,411 | B2 | 10/2013 | Dibenedetto |
| 2005/0241291 | A1 | 11/2005 | Bart et al. |
| 2010/0021285 | A1 | 1/2010 | Rowe et al. |
| 2011/0056210 | A1 | 3/2011 | Griffin et al. |
| 2011/0301822 | A1 | 12/2011 | Aurousseau |
| 2013/0094943 | A1 | 4/2013 | Bouru et al. |
| 2013/0283820 | A1* | 10/2013 | Muron .................. F01D 5/282 60/805 |
| 2013/0323012 | A1 | 12/2013 | Dong et al. |
| 2014/0174055 | A1 | 6/2014 | Adams et al. |
| 2015/0125259 | A1* | 5/2015 | Suciu ................... F02K 3/06 415/1 |

FOREIGN PATENT DOCUMENTS

| | | |
|---|---|---|
| GB | 1196588 | 7/1970 |
| GB | 1364370 A | 8/1974 |
| WO | 2013101795 A1 | 7/2013 |

OTHER PUBLICATIONS

Unofficial English Translation of Japanese Office Action issued in connection with corresponding JP Application No. 2015222553 dated Nov. 1, 2016.

Unofficial English Translation of Chinese Office Action issued in connection with corresponding CN Application No. 201511035897.2 dated Dec. 5, 2016.

* cited by examiner

GAS TURBINE ENGINE AND METHOD OF ASSEMBLING THE SAME

CROSS-REFERENCE TO RELATED APPLICATIONS

This non-provisional application claims the benefit of priority under 35 U.S.C. §119(e) to U.S. Provisional Patent Application No. 62/082,892, entitled "GAS TURBINE ENGINE AND METHOD OF ASSEMBLING THE SAME", filed Nov. 21, 2014, which is herein incorporated in its entirety by reference.

BACKGROUND

The field of this disclosure relates generally to a gas turbine engine and, more particularly, to a gas turbine engine having an adjustable flow path geometry.

Many known gas turbine engines have a ducted fan and a core arranged in flow communication with one another. The fan provides air to the core (a "core flow") and to a bypass duct surrounding the core (a "bypass flow"). The core compresses the core flow and subsequently mixes it with fuel for igniting the mixture to generate a flow of combustion gas through a turbine. The combustion gas drives the turbine, which in turn drives the fan to generate the core flow and the bypass flow.

With the bypass flow being a source of thrust for the engine, some known fans have blades for which the pitch can be varied to facilitate controlling the thrust. In that regard, these fans can be configured such that the blades, at one pitch angle, generate an aftward directed bypass flow resulting in forward thrust, and, at another pitch angle, generate a forward directed bypass flow resulting in reverse thrust. However, in these known engines, the condition of the bypass flow is often less than optimal in both directions. As such, for gas turbine engines having variable pitch fans, it would be useful to improve the condition of the bypass flow.

A key metric in establishing commercial aircraft performance is the engine's propulsive efficiency. Propulsive efficiency is a measure of the amount of power the engine delivers to the aircraft as a fraction of the total amount of kinetic power the engine imparts into the air passing through it. To achieve a high propulsive efficiency, it is desirable for the engine to impart only a minor change in jet velocity to the air it acts upon. Because this yields only small amounts of thrust per unit airflow, the engine must act on proportionately larger quantities of air in order to make sufficient thrust. As the amount of air the engine (fan) acts on increases, the weight and drag of the engine also increases. At some point, the additional weight and drag accompanying the larger diameter fan begin to outweigh the benefit of improved propulsive efficiency.

It is therefore desirable to enable modifying a geometry of the engine gas flowpath to improve propulsive efficiency of the engine over a wide operational range while reducing the weight of engine components.

BRIEF DESCRIPTION

In one embodiment, a turbofan gas turbine engine system includes a variable pitch fan (VPF) coupled to a first rotatable shaft, a low pressure compressor LPC coupled to a second rotatable shaft, the LPC including a plurality of variable pitch stator vanes interdigitated with rows of blades of a rotor of the LPC, and a core engine configured in series flow arrangement with the VPF and the LPC. The turbofan gas turbine engine system also includes a speed reduction device coupled to the first rotatable shaft and the second rotatable shaft. The speed reduction device is configured to drive the first rotatable shaft at a rotational speed that is lower than the rotational speed of the second rotatable shaft. The turbofan gas turbine engine system also includes a modulating pressure relief valve positioned between an outlet of the LPC and a bypass duct. The turbofan gas turbine engine system further includes a controller configured to schedule a position of the plurality of variable pitch stator vanes and the modulating pressure relief valve in response to an operational state of the turbofan gas turbine engine system and a temperature associated with the LPC.

In another embodiment, a method of managing a flowpath geometry of a gas turbine engine includes receiving an indication of a temperature of a low pressure compressor (LPC), the LPC positioned in serial flow communication between a fan including a plurality of variable pitch fan blades and a core engine, the core engine including a high-pressure compressor (HPC), a combustor, and a high pressure turbine (HPT) in serial flow communication. The method also includes receiving an operational state of the gas turbine engine and determining at least one of a position of a plurality of variable pitch stator vanes of the LPC and a position of a modulating pressure relief valve configured to couple an outlet of the LPC to at least one of a bypass duct and an ambient space outside the gas turbine engine. The method further includes generating at least one actuation signal configured to command the plurality of variable pitch stator vanes and the modulating pressure relief valve to a respective scheduled position.

In yet another embodiment, an aircraft includes a turbofan gas turbine engine system including a bypass duct at least partially circumscribing a gas turbine engine. The ducted turbofan gas turbine engine system includes a fan coupled to an output of a speed reduction device and a low pressure compressor (LPC) coupled to an input of the speed reduction device. The fan is configured to operate at a rotational speed less than the rotational speed of the LPC. The LPC includes a plurality of variable pitch stator vanes. The ducted turbofan gas turbine engine system further includes a low pressure turbine (LPT) coupled to the LPC, a modulating pressure relief valve configured to couple an outlet of the LPC to a bypass duct, and a controller configured to manage a position of at least one of the plurality of variable pitch stator vanes and the modulating pressure relief valve based on a temperature associated with the LPC.

DRAWINGS

These and other features, aspects, and advantages of the present disclosure will become better understood when the following detailed description is read with reference to the accompanying drawings in which like characters represent like parts throughout the drawings, wherein.

Figure 1:
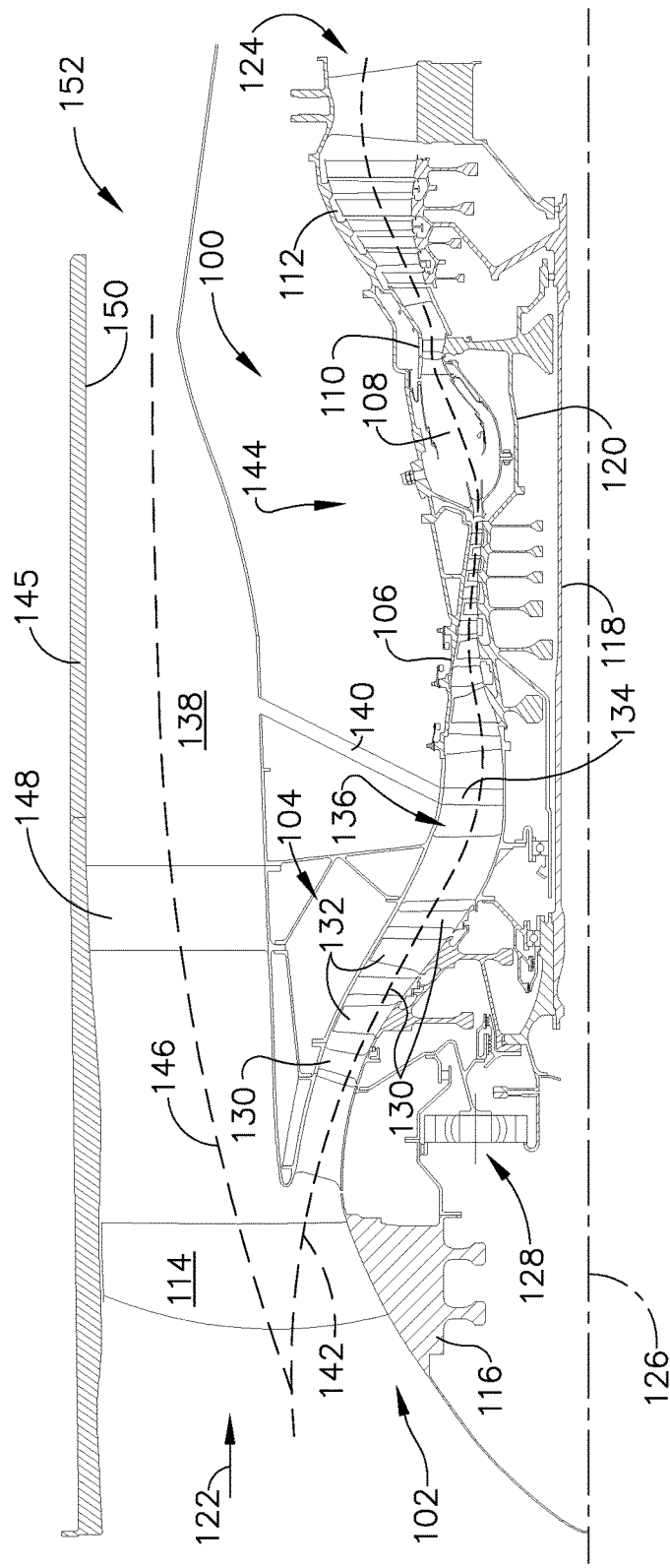
FIG. 1 is a schematic illustration of an exemplary turbine engine system including a fan assembly, a low pressure or booster compressor, a high-pressure compressor, and a combustor.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure describe a gas turbine engine architecture having a low pressure ratio, low speed, variable pitch fan (VPF), and a fixed fan exhaust nozzle area. The engine architecture reduces both the weight and drag penalties associated with achieving a given propulsive improvement, thereby shifting the optimum selection toward a larger fan and reducing fuel burn. The VPF is coupled by a speed reduction device, such as, but not limited to a gearbox and a shaft to a high speed low pressure or booster compressor (LPC) and a low pressure turbine (LPT). The LPC and LPT surround a high pressure core in a series flow arrangement. In a conventional fixed pitch fan (FPF), as the design fan pressure ratio (FPR) is reduced, a variable area fan exhaust nozzle is required to avoid operability issues with the fan at low flight mach. The presence of a VPF has the potential to enable very low fan pressure ratio engine designs (at or below 1.35) without the presence of a variable area fan exhaust nozzle. To achieve the desired fan operability characteristics, the LP spool is kept at a relatively high speed at part power cruise conditions when compared to an FPF architecture, making additional dynamic head available to attain operating pressure ratio. This approach leads to a fan that tends to operate at a nearly constant speed over a wide range of operating conditions. At part power conditions, as the core rolls back, the LPC will continue to pump, creating a flow mismatch between the LPC and HPC. To handle this, the architecture of the present disclosure employs a highly variable flow LPC. Historically, variable pitch fan engines have either been designed without an LPC or have utilized an intermediate pressure compression block. Eliminating boost from the core, as in the engine without the LPC, places a severe limitation on realizable operating pressure ratio (OPR) levels. Employing an IPC to achieve the desirable compression levels is a viable option, but the third spool carries significant complexity for a puller fan configuration in which all three spools will be concentrically oriented.

FIG. 1 is a schematic illustration of an exemplary turbine engine system 100 including a fan assembly 102, a low pressure or booster compressor 104, a high-pressure compressor 106, and a combustor 108. Fan assembly 102, booster compressor 104, high-pressure compressor 106, and combustor 108 are coupled in flow communication. Turbine engine system 100 also includes a high-pressure turbine 110 coupled in flow communication with combustor 108 and a low-pressure turbine 112. Fan assembly 102 includes an array of variable pitch fan blades 114 extending radially outward from a rotor disk 116. Low-pressure turbine 112 is coupled to fan assembly 102 and booster compressor 104 via a first drive shaft 118, and high-pressure turbine 110 is coupled to high-pressure compressor 106 via a second drive shaft 120. Turbine engine system 100 has an intake 122 and an exhaust 124. Turbine engine system 100 further includes a centerline 126 about which fan assembly 102, booster compressor 104, high-pressure compressor 106, and turbine assemblies 110 and 112 rotate. Moreover, a speed-reducing gearbox 128 is coupled along first drive shaft 118 between fan assembly 102 and low-pressure turbine 112.

Low pressure or booster compressor 104 includes a plurality of variable pitch stator vanes 130 that are inter-digitated with fixed pitch rotor blades 132. A pitch of variable pitch stator vanes 130 is adjusted by one or more actuators (not shown in FIG. 1) communicatively coupled to a controller (not shown in FIG. 1). Variable pitch stator vanes 130 are configured to adjust a geometry of a flow path through compressor 104 as commanded by the controller and effected by the one or more actuators.

A modulating pressure relief valve 134 is positioned between an outlet 136 of compressor 104 and a bypass duct 138 that at least partially surrounds turbine engine system 100. Modulating pressure relief valve 134 may include a sliding sleeve arrangement that selectively covers and uncovers a plurality of apertures through outlet 136. In other embodiments, modulating pressure relief valve 134 may be a gate type valve or damper that opens and closes a passage through a bleed duct 140 connecting outlet 136 with bypass duct 138.

An engine flow path 142 is defined through fan assembly 102, low pressure or booster compressor 104, a core engine 144 defined by high pressure compressor 106, combustor 108 and high pressure turbine 110. Flow path 142 continues through low pressure turbine 112 to ambient aft of outlet 124. A fan cowl 145 surrounds fan 114 to define bypass duct 138 about core engine 144. A bypass flow path 146 is channeled through fan assembly 102 and outlet guide vanes 148 positioned in bypass duct 138.

In operation, air entering turbine engine system 100 through intake 122 is channeled through fan assembly 102 towards booster compressor 104. Compressed air is discharged from booster compressor 104 towards high-pressure compressor 106. Highly compressed air is channeled from high-pressure compressor 106 towards combustor 108, mixed with fuel, and the mixture is combusted within combustor 108. High temperature combustion gas generated by combustor 108 is channeled towards turbine assemblies 110 and 112. Low-pressure turbine 112 rotates at a first rotational speed, and gearbox 128 operates such that fan assembly 102 operates at a second rotational speed lower than the first rotational speed. In one embodiment, the second rotational speed is such that a fan tip speed of fan blades 114 is less than about 1,200 feet per second. Combustion gas is subsequently discharged from turbine engine system 100 via exhaust 124. In an alternative embodiment, the rotational speeds of low-pressure turbine 112 and fan assembly 102 are decoupled by any mechanism or arrangement of components that enables turbine engine system 100 to function as described herein.

In various embodiments, turbine engine system 100 may incorporate thrust reverser features (not shown) that may also affect flowpaths 142 and 146. Because interior surfaces 150 of fan cowl 11045 define the radially outer boundary of bypass duct 138 as shown in FIG. 1, the continuity of such interior surfaces 158 can influence the quality of the airflow through bypass duct 138. In particular, discontinuities such as gaps along interior surfaces 150 can result in leakage from, and hence depressurization of, airflow through bypass duct 138. Thus, it is desirable to have interior surfaces 150 be substantially continuous (e.g., substantially free of discontinuities such as gaps) to facilitate minimizing pressure losses within bypass duct 138 and to facilitate optimizing the thrust generated by airflow exiting bypass duct 138, in turn facilitating optimization of the fuel efficiency of turbine engine system 100.

To facilitate maintaining interior surfaces 150 as substantially continuous with a minimum of gaps, the thrust reverser features are maintained external to bypass duct 138, which permits a fixed nozzle exit area 152. The thrust reverser features are maintained external to fan cowl 145 such that no movable components of the thrust reverser feature including spoiler panels (not shown) contact airflow within bypass duct 138 during operation of turbine engine system 100. Accordingly, fixed nozzle exit area 152 of fan cowl 145 remains the same (i.e., does not change) regardless of whether the thrust reverser feature is stowed or deployed, because components of the thrust reverser feature do not define the contour of interior surfaces 150 of fan cowl 145. For at least this reason, the thrust reverser feature having fixed nozzle exit area 152 provides distinct benefits over a variable fan nozzle (VFN). Moreover, by configuring the thrust reverser feature in this manner, fan cowl 145 is fabricated such that interior surfaces 150 proximate fixed nozzle exit area 152 are defined by a strictly static structure, which is not configured with movable components as opposed to a dynamic structure. Thus, by virtue of the thrust reverser feature being a strictly external mechanism in the exemplary embodiment, interior surfaces 150 have less discontinuities such as gaps that would have otherwise been present along interior surfaces 150 had interior surfaces 150 been defined in part by movable components the thrust reverser feature internal to fan cowl 145.

Figure 2:
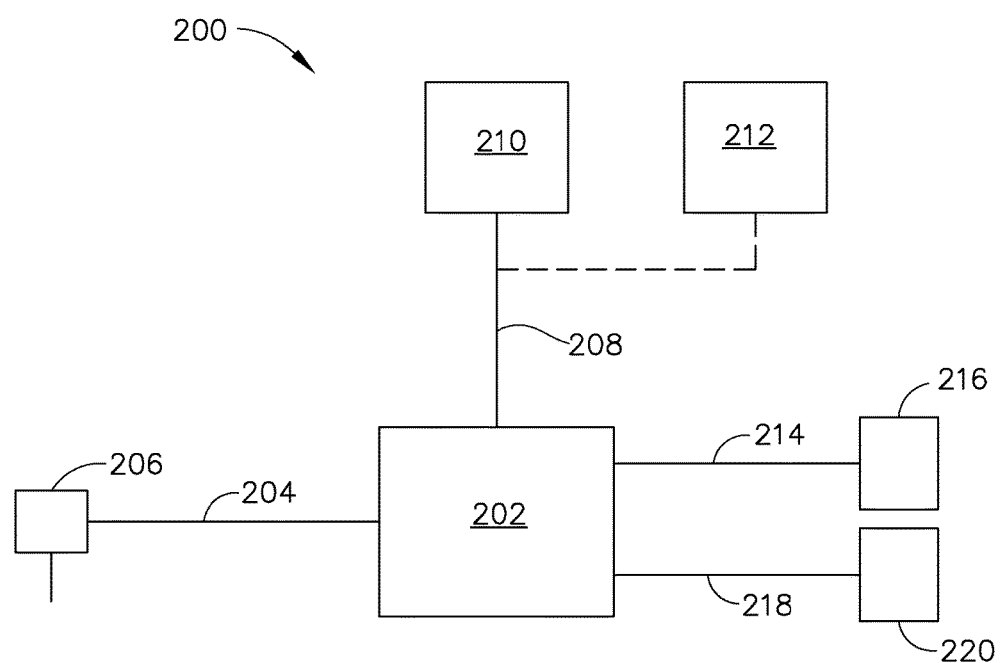
FIG. 2 is a schematic block diagram of a control system for managing a geometry of the flow path shown in FIG. 1 of gas turbine engine system shown in FIG. 1.

FIG. 2 is a schematic block diagram of a control system 200 for managing a geometry of flow path 142 (shown in FIG. 1) of gas turbine engine system 100 (shown in FIG. 1). In the example embodiment, control system 200 includes a controller 202 configured to receive a temperature signal 204 representative of a temperature associated with compressor 104 (shown in FIG. 1) from a temperature sensor 206. In various embodiments, temperature sensor 206 is positioned in flow path 142 proximate an inlet to compressor 104, an outlet from compressor 104, and/or within compressor 104. Controller 202 is also configured to receive a signal 208 indicative of an operational state of an aircraft (not shown) being powered by turbine engine system 100. Signal 208 may be generated manually by, for example, a pilot or may be generated automatically by a flight computer 210 onboard the aircraft. Additionally, signal 208 may be generated automatically by an engine computer 212, such as, but not limited to a full authority digital electronic controller (FADEC).

Controller 202 is configured to generate an actuation command 214 for one or more actuators 216 configured to control a position of variable pitch stator vanes 130 (shown in FIG. 1). Controller 202 is also configured to generate an actuation command 218 for one or more actuators 220 configured to control a position of modulating pressure relief valve 134 (shown in FIG. 1).

Although described as controlling actuators 216 and 220 using a temperature signal, controller 202 can also use any other engine parameter or combination of engine parameters to manage the geometry of flowpath flow path 142 (shown in FIG. 1).

Figure 3:
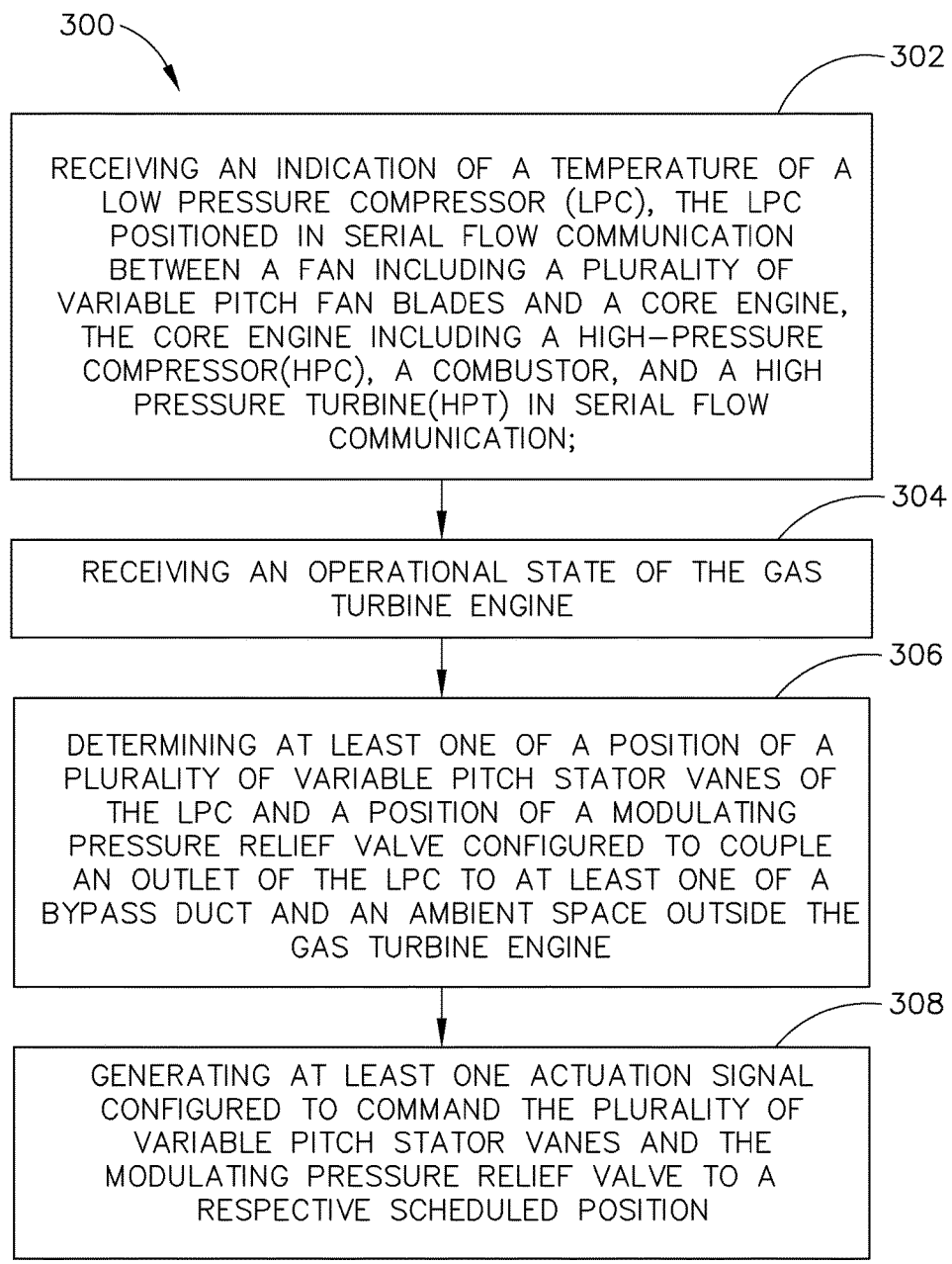
FIG. 3 is a flow chart of a method of managing a flowpath geometry of the gas turbine engine system shown in FIG. 1.

FIG. 3 is a flow chart of a method 300 of managing a flowpath geometry of a gas turbine engine. In the example embodiment, method 300 includes receiving 302 an indication of a temperature of a low pressure compressor (LPC) of a ducted turbofan gas turbine engine. The LPC is positioned in serial flow communication between a fan including a plurality of variable pitch fan blades and a core engine. The core engine includes a high-pressure compressor (HPC), a combustor, and a high pressure turbine (HPT) in serial flow communication.

Method 300 also includes receiving 304 an operational state of the gas turbine engine. The operational state relates to current or future operations planned for the engine and or vehicle the engine is powering. Operational states may include, for example, but not limited to cruise, climb, takeoff, descent, reverse thrust, taxiing, and idle. The operational state may be determined automatically by any of the computer systems operating onboard the vehicle or in communication with it, any other controllers accessible to the vehicle, and/or a manual indication input by for example, a pilot or driver.

Method 300 also includes determining 306 a scheduled position of a plurality of variable pitch stator vanes of the LPC and/or a position of a modulating pressure relief valve based on the temperature of the LPC, the operational state, and a predetermined schedule of positions. The modulating pressure relief valve is configured to couple an outlet of the LPC to at least one of a bypass duct and an ambient space outside the gas turbine engine.

Method 300 further includes generating 308 at least one actuation signal configured to command the plurality of variable pitch stator vanes and the modulating pressure relief valve to a respective scheduled position.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbofan gas turbine engine system comprising:
a variable pitch fan (VPF) assembly coupled to a first rotatable shaft;
a low pressure compressor (LPC) coupled to a second rotatable shaft, said LPC including a plurality of variable pitch stator vanes interdigitated with rows of blades of a rotor of the LPC;
a core engine configured in series flow arrangement with said VPF and said LPC;
a speed reduction device coupled to said first rotatable shaft and said second rotatable shaft, said speed reduction device configured to drive said first rotatable shaft at a rotational speed that is lower than a rotational speed of the second rotatable shaft;
a modulating pressure relief valve positioned between an outlet of said LPC and a bypass duct; and
a controller configured to schedule a position of said plurality of variable pitch stator vanes and said modulating pressure relief valve in response to an operational state of said turbofan gas turbine engine system and a received temperature signal from a sensor located at the LPC representative of a temperature associated with said LPC.

2. The turbofan gas turbine engine system of claim 1, wherein said LPC is directly coupled by the second rotatable shaft to a low pressure turbine (LPT).

3. The turbofan gas turbine engine system of claim 1, wherein said VPF is formed of a composite material.

4. The turbofan gas turbine engine system of claim 1, wherein said VPF comprises a fixed fan exhaust nozzle area.

5. The turbofan gas turbine engine system of claim 1, wherein said VPF is configured to operate at substantially constant speed over a range of operating conditions.

6. The turbofan gas turbine engine system of claim 1, wherein an operating pressure ratio of said VPF is approximately 1.0 to 1.5.

7. The turbofan gas turbine engine system of claim 1, wherein an operating pressure ratio of said VPF is approximately 1.35.

8. The turbofan gas turbine engine system of claim 1, wherein said controller is configured to at least one of move said plurality of variable pitch stator vanes in a closed direction and move said modulating pressure relief valve in an open direction when a received temperature signal increases above a predetermined scheduled threshold.

9. The turbofan gas turbine engine system of claim 1, wherein said VPF is configured to produce reverse thrust using a pitch of blades of said VPF.

10. A method of managing a flowpath geometry of a gas turbine engine, said gas turbine engine comprising a variable pitch fan (VPF) assembly coupled to a first rotatable shaft; a low pressure compressor (LPC) coupled to a second rotatable shaft, said LPC including a plurality of variable pitch stator vanes interdigitated with rows of blades of a rotor of the LPC; a core engine configured in series flow arrangement with said VPF and said LPC; a speed reduction device coupled to said first rotatable shaft and said second rotatable shaft, said speed reduction device configured to drive said first rotatable shaft at a rotational speed that is lower than a rotational speed of the second rotatable shaft; a modulating pressure relief valve positioned between an outlet of said LPC and a bypass duct; said method comprising: receiving an indication of a temperature of the LPC from a sensor located at the LPC, the LPC positioned in serial flow communication between the VPF and a core engine, the core engine including a high pressure compressor (HPC), a combustor, and a high pressure turbine (HPT) in serial flow communication; receiving an operational state of the gas turbine engine; determining at least one of a position of the plurality of variable pitch stator vanes of the LPC and a position of the modulating pressure relief valve; and generating g at least one actuation signal configured to command the plurality of variable pitch stator vanes and the modulating pressure relief valve to a respective scheduled position.

11. The method of claim 10, wherein receiving an indication of a temperature of the LPC comprises receiving an indication of a temperature of air flow in at least one of an inlet to the LPC, an outlet to the LPC, and a flowpath through the LPC.

12. The method of claim 10, further comprising determining a scheduled position for each of the plurality of variable pitch stator vanes and the modulating pressure relief valve based on at least one of the temperature of the LPC and the operational state of the gas turbine engine.

13. The method of claim 10, further comprising operating the VPF at a substantially constant speed.

14. The method of claim 10, further comprising changing a thrust output of the gas turbine engine using a pitch of the VPF.

15. The method of claim 10, further comprising at least one of moving the plurality of variable pitch stator vanes in a closed direction and moving the modulating pressure relief valve in an open direction when the temperature of the LPC increases above a scheduled threshold.

16. An aircraft comprising a turbofan gas turbine engine system comprising a bypass duct at least partially circumscribing a gas turbine engine, the turbofan gas turbine engine system comprising:
a variable pitch fan (VPF) assembly coupled to a speed reduction device;
a low pressure compressor (LPC) coupled to the speed reduction device, the VPF configured to operate at a rotational speed less than a rotational speed of the LPC, said LPC comprising a plurality of variable pitch stator vanes;
a low pressure turbine (LPT) coupled to said LPC;
a modulating pressure relief valve configured to couple an outlet of the LPC to the bypass duct; and
a controller configured to manage a position of said plurality of variable pitch stator vanes and said modulating pressure relief valve based on a received temperature signal from a sensor located at the LPC representative of a temperature associated with said LPC.

17. The system of claim 16, wherein the controller is configured to move said plurality of variable pitch stator vanes in a closed direction when the temperature associated with said LPC increases above a predetermined range.

18. The system of claim 16, wherein the controller is configured to move said modulating pressure relief valve in an open direction when the temperature associated with said LPC increases above a predetermined range.

19. The system of claim 16, wherein the controller is configured to maintain an operating pressure ratio of said VPF between approximately 1.0 to 1.5.

* * * * *